W. DUESLER, Jr.
Agricultural Fork.

No. 197,209. Patented Nov. 20, 1877

WITNESSES
Nat. E. Oliphant
W. E. Chaffee

INVENTOR
William Duesler Jr.
per Chas. H. Fowler,
Attorney.

N. PETERS, PHOTO-LITHOGRAPHER, WASHINGTON, D. C.

UNITED STATES PATENT OFFICE.

WILLIAM DUESLER, JR., OF ST. JOSEPH, MISSOURI.

IMPROVEMENT IN AGRICULTURAL FORKS.

Specification forming part of Letters Patent No. 197,209, dated November 20, 1877; application filed October 10, 1877.

*To all whom it may concern:*

Be it known that I, WILLIAM DUESLER, Jr., of St. Joseph, in the county of Buchanan and State of Missouri, have invented a new and valuable Improvement in Agricultural Forks; and I do hereby declare that the following is a full, clear, and exact description of the construction and operation of the same, reference being had to the annexed drawing, making a part of this specification, and to the letters and figures of reference marked thereon.

Figure 1:
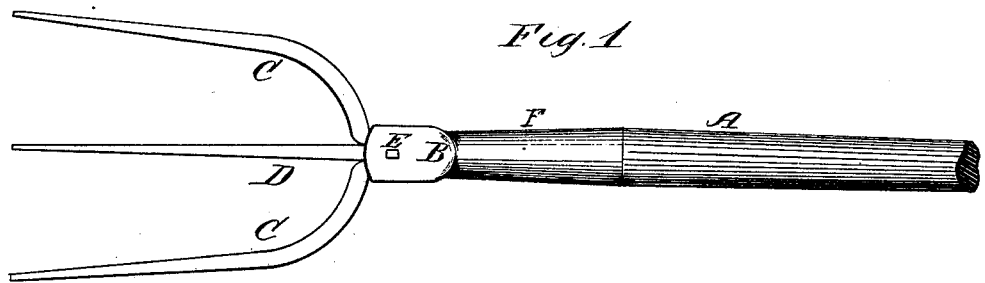
Figure 2:
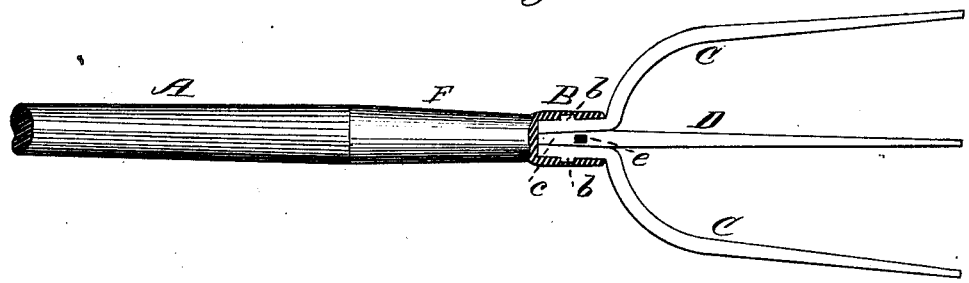
Figure 3:
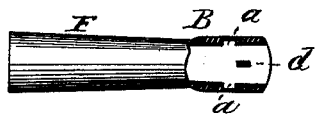
Figure 4:
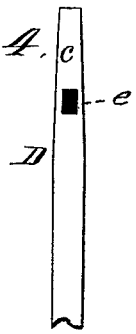

Figure 1 of the drawing is a representation of a top or plan view of my invention. Fig. 2 is a similar view with a portion of the head of the handle broken away. Fig. 3 is a detached view of the head, partly in section; and Fig. 4, a detached view of one of the tines or prongs, showing the tapering shank thereof.

This invention has relation to agricultural forks, and is designed as an improvement upon my former patent, bearing date December 12, 1876, and numbered 185,166; and the object and purpose of the present invention are to simplify the general construction of the fork, and also render the prongs or tines of the same easily removable from the handle when broken or injured by any cause, and at the same time making a secure and durable fastening or locking device, by which the prongs or tines are secured to the handle.

The invention therefore consists in the construction of the several parts, as will be hereinafter described, and subsequently pointed out in the claim.

In the accompanying drawing, A represents the handle, to which is secured a metallic ferrule, F, having its head B flattened, so as to form a rectangular mortise or socket, slightly tapering, and having formed at its sides recesses $a$, to receive shoulders $b$ upon the outer tines or prongs C. After these tines or prongs have been placed within the head B, they are forced out laterally against the sides of the head by a wedge-shaped shank, $c$, of a tine or prong, D, the same being held within the head and against the outer prongs C by a wedge, E, which passes through suitably-formed openings $d$ in the head and opening $e$ in the shank of the prong D.

By forming the mortise or socket in the head B of the ferrule rectangular in cross-section, and of a width sufficient to receive a tine, all vertical movement of the tines is prevented.

It will thus be seen that the central prong D, which has its shank $c$ tapering or wedge-shaped in form, serves to firmly lock the other prongs within the head, and when found necessary from any cause to remove any of the prongs, the wedge E is withdrawn, and also the prong D, which will allow the ready withdrawal of any or all of the remaining prongs.

If more than three tines or prongs are used, recesses and shoulders may be formed in the shanks thereof, as in my former patent.

My invention may be applicable to all kinds of forks, for whatever use, and may be made of any suitable material found best adapted to the style of fork used.

I am aware that a ferrule provided with a socket having an internal circular flange or recess for the purpose of holding the outside tines, which are provided with projections catching over the flange in the ferrule, and keyed in place by the shank of the central tine or tines, has heretofore been employed, and I therefore lay no claim to such invention.

Having now fully described my invention, what I claim as new, and desire to secure by Letters Patent, is—

The ferrule F, with a flattened head, B, having a tapering socket, rectangular in cross-section, and provided with the recesses $a\ a$ in its sides, in combination with the side tines C C, having shoulders $b\ b$, the central tine D, having wedge-shaped shank, and the wedge E, substantially as described, and for the purpose set forth.

In testimony that I claim the above I have hereunto subscribed my name in the presence of two witnesses.

WILLIAM DUESLER, JR.

Witnesses:
S. I. RILEY,
HOWARD WILLIAMS.